United States Patent Office 3,409,517
Patented Nov. 5, 1968

3,409,517
METHOD OF PRODUCING A MERCURY-CALOMEL ELECTRODE
Serafim Fedorovich Zavgorodny, Budennovsky, Prospect 70, Apt. 2, and Ivan Fedotovich Kamyshnikov, Prospect K. Marxa 55, Apt. 6, both of Rostov-na-Donu, U.S.S.R.
No Drawing. Filed May 11, 1965, Ser. No. 454,960
5 Claims. (Cl. 204—29)

ABSTRACT OF THE DISCLOSURE

A mercury-calomel electrode is produced by calcinating a graphite rod, washing the graphite rod with water, coating the graphite rod with a layer of mercury and calomel by electro-chemical deposition thereof from a solution of $Na_2(HgCl_4)$ at a potential of 1.3 to 1.7 volts and thereafter immersing the coated graphite rod in solution of potassium chloride.

---

The present invention relates to a method of producing a mercury-calomel electrode. Such electrodes are used in potentiometric titrations and also for the determination of the pH of solutions.

There is a well-known method of producing the mercury-calomel electrode according to which platinum wire soldered in a glass tube is immersed into a vessel filled with mercury. On the mercury surface there is placed a layer of specially prepared mercury-calomel paste, and then the vessel is filled with a saturated solution of potassium chloride.

The equilibrium potential of this electrode is stabilized in approximately two days.

The disadvantages of this well-known method reside in the complex and lengthy technology for producing mercury-calomel electrodes which requires the use of highly purified mercury as well as the preparation of a mercury-calomel paste by mixing metallic mercury with calomel. This method also requires the use of costly platinum.

The object of this invention is to provide a method which allows a reduction in the time required for producing the mercury-calomel electrode, replaces costly platinum with a cheaper material and obviates the necessity of using highly purified mercury.

According to the above-mentioned object, the method of the invention consists in coating a graphite rod with a layer of calomel and mercury, which mercury is electro-chemically deposited from an electrolyte of a $Na_2(HgCl_4)$ composition. The said composition is prepared by dissolving mercury chloride in a saturated solution of sodium chloride.

The graphite rod is first calcinated in a burner flame, then washed into hot distilled water and cemented in a glass tube, in which a small amount of metallic mercury is placed to provide contact with an external circuit.

The electrolysis is caried out at a potential of 1.3 to 1.7 v., preferably at 1.5 v. for 25–30 minutes, and then the graphite rod is washed with distilled water. To increase the strength of the calomel and mercury layer deposited on the graphite rod, the latter is coated with a layer of collodion diluted in ester in the ratio of 1:3 and then immersed in a saturated solution of potassium chloride.

Another method of stabilizing the electrode consists in immersing the electrode in a hot 2 percent solution of agar-agar, prepared on the basis of a saturated solution of potassium chloride.

The values of the potentials obtained for the mercury-calomel electrode prepared according to the present method, as compared with those of the known mercury-calomel electrode, as well as the data confirming the stability and reproducibility of the graphite-calomel electrode are given in Tables 1 and 2.

Example 1

First an electrolyte is prepared by dissolving 7.2 g. of NaCl in 20 ml. of water and adding 0.66 g. of $HgCl_2$ thereto. Then the thusly prepared solution is diluted with distilled water in the ratio of 1:2. A graphite rod, 1.5 mm. long, is placed into the thus prepared electrolyte. The graphite rod is precalcinated in a burner flame to remove adhesives, washed in boiling distilled water for 2 hours, dried and a part of the rod is cemented in a glass tube, in which a small amount of metallic mercury is placed in order to provide contact with an external circuit. Then the exposed part of the rod is immersed in the prepared electrolyte at a temperature of 60° C. in order that electrodeposition may be effected.

In the electrodeposition, a platinum rod is used as the anode, while the graphite rod serves as the cathode. The electrodes are coupled to the poles of a D.C. source with a potential of 1.5 v.

The electrolysis is carried out for 20–30 minutes with stirring. Then the graphite rod is carefully washed in distilled water at room temperature and dried.

The dry electrode is then coated with a layer of collodion dissolved in ester and then immersed into a saturated solution of potassium chloride.

TABLE 1.—RESULTS OF DETERMINING pH WITH VARIOUS GRAPHITE CALOMEL ELECTRODES

| Testing day | Temperature, ° C. | Nos. of electrodes | Electrolyte | Mv. | Difference, mv. | pH | Difference, pH |
|---|---|---|---|---|---|---|---|
| 11th | 21 | No. 1 No. 2 No. 4 | Buffer solution with pH 3.2. | 263 263 263 | 0 | 3.26 | 0 |
| 11th | 21 | No. 2 No. 4 | Buffer solution, pH 2.0. | 332 333 | 1 | 2.09 2.06 | 0.02 |
| 11th | 22 | No. 1 No. 2 No. 4 | Buffer solution, pH 7 | 44 44 44.5 | 0.5 | 0.0 7.0 6.99 | 0.01 |

TABLE 2.—DETERMINATION OF pH

| Serial No. | Testing day | Temperature, °C | Electrodes | | Method of measurement | | Electrolyte | Potential, mv. | Difference, mv. | pH | Difference, mv. |
|---|---|---|---|---|---|---|---|---|---|---|---|
| | | | Calomel | Graphite, mercury-calomel saturated | Quinhydrone | Hydrogen | | | | | |
| 1 | 2 | 3 | 4 | 5 | 6 | 7 | 8 | 9 | 10 | 11 | 12 |
| 1 | 1st | 22 | Calomel | G.M.C.S. | Quin Quin | | Acetate buffer solution. | 183 183 | 0 | 4.62 4.62 | 0 |
| 2 | 3rd | | Calomel | | Quin Quin | | Acetate buffer solution. | 183 183 | 0 | 4.62 4.62 | 0 |
| 3 | 3rd | 25 | Calomel | G.M.C.S. | Quin Quin | | Buffer solution, pH 1.4. | 368 367 | 1 | 1.43 1.45 | 0.02 |
| 4 | 3rd | 25 | Calomel | G.M.C.S. | Quin Quin | | Buffer solution, pH 2.0 | 334 335 | 1 | 2.01 1.99 | 0.02 |
| 5 | 3rd | 25 | Calomel | G.M.C.S. | Quin Quin | | Buffer solution, pH 4.3. | 1.94 1.94 | 0 | 4.38 4.38 | 0 |
| 6 | 3rd | 25 | Calomel | G.M.C.S. | Quin Quin | | Buffer solution, pH 5.5. | 126 126.5 | 0.5 | 5.53 5.52 | 0.01 |
| 7 | 3rd | 22 | Calomel | G.M.C.S. G.M.C.S. | Quin Quin | | Buffer solution, pH 8.1. | 20 18 | 2 | 8.10 8.09 | 0.01 |
| 8 | 4th | 25 | Calomel | G.M.C.S. | Quin Quin | | Buffer solution, pH 7.0. | 38 38 | 0 | 7.02 7.02 | 0 |
| 9 | 6th | 25 | Calomel | G.M.C.S. | Quin Quin | | Buffer solution, pH 2.3. | 320 320 | 0 | 2.25 2.25 | 0 |
| 10 | 7th | 25 | Calomel | G.M.C.S. | | Hyd | Buffer solution, pH 8.4. | 744 744 | 0 | 8.43 8.43 | 0 |
| 11 | 7th | 24 | Calomel | G.M.C.S. | | Hyd | Buffer solution, pH 9.47. | 806 805 | 1 | 947 946 | 0.01 |
| 12 | 7th | 25 | Calomel | G.M.C.S. | | Hyd | Buffer solution, pH 10.57. | 866 869 | 3 | 10.50 10.55 | 0.05 |
| 13 | 7th | 25 | Calomel | G.M.C.S. | | Hyd | Buffer solution, pH 11.70. | 937 937 | 0 | 11.70 11.70 | 0 |
| 14 | 10th | 22 | Calomel | G.M.C.S. | Quin Quin | | Buffer solution, pH 3.2. | 261 262 | 1 | 3.29 3.27 | 0.02 |
| 15 | 11th | 22 | Calomel | G.M.C.S. | Quin Quin | | Buffer solution, pH 7.0. | 44 44 | 0 | 7.00 7.00 | 0 |

We claim:
1. A method of producing a mercury-calomel electrode comprising calcinating a graphite rod, washing the calcinated graphite rod, coating the washed, calcinated graphite rod with a layer of mercury and calomel by depositing the coating electrochemically from a solution of

$$Na_2(HgCl_4)$$

at a potential of 1.3 to 1.7 volts and thereafter immersing the thusly coated graphite rod in a saturated solution of potassium chloride.

2. A method as claimed in claim 1 wherein the potential is 1.5 volts.

3. A method as claimed in claim 1 further comprising coating the graphite rod with a layer of collodion before immersing same in the saturated solution of potassium chloride.

4. A method as claimed in claim 1 wherein the solution of $Na_2(HgCl_4)$ is prepared by mixing mercuric chloride with a saturated solution of sodium chloride in a weight ratio of about 1:10 and thereafter diluting the mixture by addition of water in an amount twice that of the mixture.

5. A method as claimed in claim 1 wherein the coating is deposited electro-chemically for a period of 20–30 minutes at a temperature of about 60° C.

References Cited

UNITED STATES PATENTS 3,006,821   10/1961   Haring _____ 204—56

OTHER REFERENCES

Ives et al.: "Reference Electrodes," 1961, pp. 128–137.

HOWARD S. WILLIAMS, *Primary Examiner.*

T. TUNG, *Assistant Examiner.*